Patented Dec. 18, 1951

2,579,216

UNITED STATES PATENT OFFICE

2,579,216

TANNING AGENTS AND A PROCESS OF PREPARING THEM

Christoph Nikolaus Jakobus Thomsen, deceased, late of Taunus, Germany, by Gertrüd Thomsen, administratrix, Kelkheim-Münster im Taunus, Germany, assignor to Farbwerke Hoechst vormals Meister Lucius & Bruning, Frankfurt (Main), Hoechst, Germany No Drawing. Application May 13, 1949, Serial No. 93,193. In Germany October 1, 1948

5 Claims. (Cl. 260—25)

The present invention relates to tanning agents and to a process of preparing them.

The production of tanning agents from colophony is attended by considerable difficulties. In the method of direct sulfonation considerable decomposition occurs owing to the high temperatures and large excess of sulfonating agent required. Tanning agents so obtained produce dark and flat leather.

By the addition of phenols before or during the sulfonation tanning agents can be obtained having a better fulling effect and a lighter and clearer tint, but their resistance to salts and the compatibility with extracts is generally insufficient. It is necessary for the production of serviceable tanning agents to reduce their content of electrolytes, which may be carried out by washing with water or salt liquors.

It is an object of this invention to prepare new and valuable tanning agents which are free from the drawbacks connected with the known tanning agents prepared with the aid of colophony.

It has been found that condensation products having a tanning action and very good properties are obtainable by sulfonating a mixture of colophony and a naphthol, reacting the sulfonation product with a phenol alcohol if desired in the presence of a free phenol, and then reacting the resulting condensation product with formaldehyde. Brown tanning agents are obtained which strike through rapidly and show on analysis a content of tanning matter up to 95 parts by weight per 100 parts by weight of dry residue, and which maintain their good tanning action even at high pH values. In many cases they produce a well plumped leather of an excellent rendement and great firmness, which is similar to bark-tanned leather.

For the sulfonation in admixture with colophony either alpha-naphthol or beta-naphthol are suitable. The sulfonation does not involve any particular difficulties, it is carried out at raised temperatures in the manner usual for such sulfonations. In order to ensure that the sulfonation occurs satisfactorily and that, before all, a sulfo-group enters also the molecule of the colophony, it is of advantage to heat the sulfonation mixture for some time to temperatures of at least 110° C. It is of advantage to keep the temperature at the beginning of the operation somewhat lower, e. g. approximately between 70 and 100° C. The sulfonating agent may be added to the mixture of naphthol and colophony or the naphthol and/or colophony may be introduced into the sulfonating agent.

The introduction of colophony should be regulated so as to avoid foaming over. The usual sulfonating agents may be used, for instance sulfuric acid of 95 to 100 per cent strength, fuming sulfuric acid or chlorosulfonic acid. The relative proportions of colophony and naphthol may be varied within wide limits, namely from 1 part of colophony to 1.3 up to 6 parts of naphthol. The proportion of 1 part of colophony to 2 parts of naphthol is of advantage. During the reaction monosulfonic acids of the colophony and of the naphthol are formed predominantly. Naphtholdisulfonic acids are also formed to a small extent.

The next step of the process is the reaction of the naphthol-colophony-sulfonic acids with a phenol alcohol. Phenol-alcohols are water soluble, low molecular reaction products from phenols with formaldehyde, expediently in the presence of water, formaldehyde-yielding substances or other compounds capable of introducing —$CH_2OH$-groups into the aromatic nuclei. The operation is performed by reacting less than 1 mol of formaldehyde with 1 mol of phenol. It is of special advantage to use only about 0.4 mol of formaldehyde per one mol of phenol. The manufacture of such phenol alcohols is generally known. It is carried out by reacting a phenol with formaldehyde in the presence of a small quantity of an alkaline condensing agent, such as sodium carbonate or sodium hydroxide solution. In order to accelerate the reaction, temperatures of up to 100° C. may be used. As an example for the reaction of another compound capable of introducing —$CH_2OH$-groups there may be mentioned the reaction of a phenol with methylene chloride in the presence of sodium hydroxide solution and, if necessary, under pressure.

As phenols may be used for example phenol itself, cresols, furthermore mixtures of cresols or of cresols with a phenol, finally commercial products containing mixtures of mononuclear phenols, such as the so-called phenol oil containing phenol itself, cresols, xylenols and phenols with two phenolic hydroxyl groups.

The so obtained phenol alcohols, generally in an aqueous solution, are reacted with the reaction mixture containing naphthol-colophonysulfonic acids. The condensation is suitably conducted at temperatures of approximately 90–100° C., it occurs without difficulties and is generally terminated after about ½ hour. The reaction is finished when the reaction product readily dissolves in water. In this case, too, the proportions between sulfonic acid and phenol alcohol may be varied within relatively wide limits. However, it proved to be of advantage to apply such a proportion of phenol alcohol that about 1 part of the phenol or the phenols used for the manufacture of the phenol alcohol corresponds to about 1 part of the originally used naphthol.

If during the reaction of the phenol alcohol a free phenol is still present, the total amount of the free phenol and that used for the phenol alcohol advantageously equals approximately the quantity of the originally used naphthol. As such phenols the foregoing phenols can likewise be employed.

The last step of the process comprises the after-treatment of the condensation products with formaldehyde, which is advantageously performed after dilution of the condensation product by means of water. It takes place at temperatures of about 90–100° C. The proportion of formaldehyde may vary within wide limits. It is recommended to use such a total amount of formaldehyde (i. e. of the formaldehyde used for the manufacture of the phenol alcohol plus the formaldehyde used for the after-treatment) that approximately 0.75 up to 0.95 mol of formaldehyde corresponds to approximately 1 mol of the total amount of phenol applied (i. e. the phenol used for the manufacture of the phenol alcohol plus the phenol possibly present in a free state). Instead of free formaldehyde, compounds may be used yielding formaldehyde under the reaction conditions, for instance hexamethylene tetramine embodying simultaneously the advantage that the ammonia set free at the same time neutralizes the tanning agent.

The new tanning agents formed in the process described above are neutralized in the usual way with organic acids and adjusted to the desired acidity. They are applied in form of aqueous solutions (of about 50–60 per cent strength) as obtained according to this process.

The following examples serve to illustrate the invention, but they are not intended to limit it thereto, the parts being by weight:

1. 280 parts of beta-naphthol in powdered form are rapidly added at a temperature of 70–90° C. and 50 parts of colophony at a temperature of 90–100° C. to 280 parts of sulfuric acid of 100 per cent strength, while stirring. After these additions, the mixture is heated for a little time at 115° C. and cooled to 95° C. 460 parts of a liquid condensation product of cresol-phenol and formaldehyde are then introduced, while stirring vigorously. The mixture is then diluted with 80 parts of water, and is further condensed at 95° C. with 150 parts of formaldehyde solution of 30 per cent strength diluted by 30 parts of water.

The condensation product of the phenols and formaldehyde is prepared by heating for 3 hours at a temperature of 80° C., while stirring, a mixture consisting of 160 parts of phenol, 160 parts of cresol, 140 parts of formaldehyde solution of 30 per cent strength and 0.7 part of anhydrous sodium carbonate.

The tanning agent is neutralized with an aqueous solution of ammonia, and adjusted with acetic acid to an acidity such that 10 grams of the mixture require 10 cc. of an n-solution of sodium hydroxide for its complete neutralization.

The tanning agent is soluble in water to a clear solution. It strikes through well and rapidly, produces a brown leather of good plumpness and fine quality and firmness and has an excellent analysis.

2. The procedure is the same as that described in Example 1, except that for the reaction with formaldehyde cresol is used alone, instead of phenol and cresol. The resulting tanning agent has properties similar to those of the product of Example 1.

What is claimed is:

1. The products obtained by sulfonating a mixture of colophony and a naphthol at elevated temperatures, reacting a phenol alcohol with the product thus obtained and then causing formaldehyde to act at temperatures of about 90–100° C. upon the condensation product thus obtained, said products showing good tanning properties even at high pH values.

2. The products obtained by sulfonating a mixture of colophony and beta-naphthol at elevated temperatures, reacting a phenol alcohol with the product thus obtained and then causing formaldehyde to act at temperatures of about 90–100° C. upon the condensation product thus obtained, said products showing good tanning properties even at high pH values.

3. The process which comprises sulfonating a mixture of colophony and a naphthol at elevated temperatures, reacting a phenol alcohol with the product thus obtained and then causing formaldehyde to act at temperatures of about 90–100° C. upon the condensation product thus obtained.

4. The process which comprises sulfonating a mixture of colophony and a naphthol at elevated temperatures, reacting a phenol alcohol and a phenol with the product thus obtained and then causing formaldehyde to act at temperatures of about 90–100° C. upon the condensation product thus obtained.

5. The process which comprises sulfonating a mixture of colophony and a naphthol at elevated temperatures, reacting the sulfonation product with a mixture of phenol alcohols obtained by causing formaldehyde to act upon a mixture of phenols in the presence of an alkaline condensing agent, and then causing formaldehyde to act at temperatures of about 90–100° C., upon the condensation product thus obtained.

GERTRUD THOMSEN,
*Administratrix of the Estate of Christoph Nikolaus Jakobus Thomsen, Deceased.*

No references cited.